United States Patent
Yoho, Sr.

[11] Patent Number: 5,931,016
[45] Date of Patent: Aug. 3, 1999

[54] AIR CONDITIONING SYSTEM HAVING MULTIPLE ENERGY REGENERATION CAPABILITIES

[75] Inventor: Robert W. Yoho, Sr., Clearwater, Fla.

[73] Assignee: Advanced Thermal Technologies, LLC, Clearwater, Fla.

[21] Appl. No.: 08/953,832

[22] Filed: Oct. 13, 1997

[51] Int. Cl.[6] ................................. F25D 23/00
[52] U.S. Cl. .................... 62/271; 62/78; 62/94
[58] Field of Search ............... 62/94, 93, 271, 62/78

[56] References Cited

U.S. PATENT DOCUMENTS

| | | |
|---|---|---|
| 1,872,783 | 8/1932 | Miller . |
| 1,970,301 | 8/1934 | Frankel ........................................ 257/9 |
| 2,257,478 | 9/1941 | Newton ........................................ 62/94 |
| 2,266,219 | 12/1941 | Larriva ........................................ 62/139 |
| 2,993,563 | 7/1961 | Munters et al. ........................... 183/4.6 |
| 3,009,684 | 11/1961 | Munters ..................................... 257/267 |
| 3,470,708 | 10/1969 | Weil et al. .................................. 62/271 |
| 3,708,956 | 1/1973 | Norback ....................................... 55/20 |
| 3,844,737 | 10/1974 | Macriss et al. .............................. 55/34 |
| 4,134,743 | 1/1979 | Macriss et al. .............................. 55/34 |
| 4,180,985 | 1/1980 | Northrup, Jr. ................................. 62/94 |
| 4,474,021 | 10/1984 | Harband ....................................... 62/94 |
| 4,887,438 | 12/1989 | Meckler ...................................... 62/271 |
| 4,904,289 | 2/1990 | Miyakami et al. ........................... 62/78 |
| 4,990,313 | 2/1991 | Pacosz ....................................... 422/121 |
| 5,159,972 | 11/1992 | Gunnerson et al. ......................... 165/32 |
| 5,170,633 | 12/1992 | Kaplan ........................................ 62/94 |
| 5,325,676 | 7/1994 | Meckler ....................................... 62/93 |
| 5,333,470 | 8/1994 | Dinh ........................................... 62/333 |
| 5,353,606 | 10/1994 | Yoho et al. ................................. 62/271 |
| 5,501,084 | 3/1996 | Chang et al. ............................... 62/264 |
| 5,502,975 | 4/1996 | Brickley et al. .............................. 62/94 |
| 5,517,828 | 5/1996 | Calton et al. ............................... 62/271 |
| 5,551,245 | 9/1996 | Calton et al. ................................. 62/90 |
| 5,558,158 | 9/1996 | Elmore ..................................... 165/122 |
| 5,564,281 | 10/1996 | Calton et al. ................................. 62/90 |
| 5,579,647 | 12/1996 | Calton et al. ................................. 62/94 |
| 5,632,954 | 5/1997 | Coellner et al. ............................. 422/4 |
| 5,649,428 | 7/1997 | Calton et al. ................................. 62/94 |

Primary Examiner—William Doerrler
Attorney, Agent, or Firm—Joseph C. Mason, Jr.; Dennis G. LaPointe

[57] ABSTRACT

An air conditioning system is provided which utilizes both exhaust and outside air energy to regenerate the latent and sensible heat removal operations while not detrimentally increasing the bacterial contamination risks associated with exhaust air energy recoupment. The air conditioning system includes a supply air passageway through which supply air flows during conditioning thereof and a desiccant wheel for reducing the humidity of supply air in the supply air passageway. The system also includes separate exhaust air and outside air passageways. A first circulation assembly is provided for circulating a heat transfer medium between a refrigerant-type cooling assembly and a first transfer zone disposed in the exhaust air passageway and a second circulation assembly is provided for circulating a heat transfer medium between the cooling assembly and a second transfer zone disposed in the outside air passageway. Since the exhaust air is not mixed with the outside air, the outside air can be used to regenerate the desiccant wheel during its movement through the second heat transfer zone without risk of harmful bacterial growth promotion associated with the use of exhaust air in direct contact with the supply air.

14 Claims, 4 Drawing Sheets

AIR CONDITIONING SYSTEM HAVING MULTIPLE ENERGY REGENERATION CAPABILITIES

FIELD OF THE INVENTION

The present invention relates to a system for conditioning air for delivery to an interior space and, more particularly, to an air conditioning system which permits recoupment of return or exhaust air while reducing the risk of health adverse contamination of the conditioned air.

BACKGROUND OF THE INVENTION

Regeneratable air conditioning systems provide the possibility of recouping some of the energy of the return or exhaust air which has just previously circulated in an interior space as a cooled and humidity conditioned air. It is known, for example, to pass such exhaust air through a heater to increase its temperature and to decrease its humidity content and to thereafter pass the exhaust air into contact with a desiccant type humidity removal device which conditions the process or supply air. In one type of desiccant device, a desiccant wheel is rotated through a regeneration zone in which heated exhaust air removes moisture from the portion of the wheel in the regeneration zone to thereby restore that wheel portion for subsequent moisture pick up from the supply air.

Additionally, it is known to draw outside air which has not circulated in the interior space into an air conditioning system to assist in the latent heat or the sensible heat removal operations. Although such outside air may have a higher enthalpy or heat content than the exhaust air and, thus, have correspondingly less capacity for cooling the heat removal elements, such air does not bring with it one drawback of the exhaust air—namely, the drawback that the energy recoupment of exhaust air may promote the growth of detrimental bacteria such as legionella pneumophila which causes legionnaires' disease and Pontiac fever.

It has been suggested to utilize both exhaust air and outside air for regeneration purposes. For example, U.S. Pat. No. 5,170,633 to Kaplan discloses an air conditioning system having two desiccant wheels and evaporative coolers with regeneration being partially provided by waste or exhaust heat. However, the contamination risk noted with respect to the exhaust air is not specifically addressed by Kaplan.

Thus, the need exists for an air conditioning system which maximizes the recoupment of exhaust air energy and additionally utilizes the energy of outside air while minimizing contamination risks. Moreover, such an improved air conditioning system could reduce the operating cost of conditioning the air if the removal of latent heat is assisted without a commensurate increase in energy requirements for removing sensible heat.

However, in view of the prior art at the time the present invention was made, it was not obvious to those of ordinary skill in this art how an improved air conditioning system could be provided.

SUMMARY OF THE INVENTION

The present invention provides an air conditioning system which utilizes both exhaust and outside air energy to regenerate the latent and sensible heat removal operations while not detrimentally increasing the bacterial contamination risks associated with exhaust air energy recoupment. In addition, the present invention provides such a system in a single unit package format which allows the system to be implemented in a full range of restricted space situations.

The advantages of the air conditioning system are realized, according to one aspect of the present invention, in a system for conditioning air to be supplied to an interior space having a means defining a passageway through which supply air flows during conditioning thereof, the supply air passageway being communicated with the interior space for delivery of conditioned supply air to the interior space, and a means for advancing supply air along the supply air passageway. Additionally, the system includes means for reducing the humidity of supply air in the supply air passageway, the humidity reducing means being recircularbly movable between a supply air contact area in which it contacts supply air to receive water content therefrom and thereby reduce the humidity of the supply air and a regeneration area in which water content is removed from the humidity reducing means.

The air conditioning system of the one aspect of the present invention also includes means for cooling reduced humidity supply air, the cooling means being disposed downstream of the humidity reducing means and means defining an exhaust air passageway separate from the supply air passageway for the flow therethrough of an air stream constituted of at least exhaust air received from the interior space. Additionally, the system includes means defining an outside air passageway separate from the supply air passageway and the exhaust air passageway, the outside air passageway for the flow therethrough of outside air received from outside of the interior space.

The inventive system further includes a first circulation means for circulating a heat transfer medium between the cooling means and a first transfer zone disposed in the exhaust air passageway; and a second circulation means for circulating a heat transfer medium between the cooling means and a second transfer zone disposed in the outside air passageway. In operation of the system, the passage of outside air into contact with the second circulation means results in a heat exchange between the heat transfer medium and outside air by which the outside air is heated to become increased heat content outside air and the heat transfer medium is cooled, and the regeneration area for regenerating the humidity reducing means disposed downstream of the second transfer zone in the outside air passageway receives increased heat content outside air in a regeneration process by which the increased heat content outside air removes water content of the humidity reducing means.

According to another aspect of the present invention, there is provided a system for conditioning air to be supplied to an interior space which also includes a supply air passageway, an exhaust air passageway, and an outside air passageway. Additionally, the system includes means for reducing the humidity of supply air in the supply air passageway, the humidity reducing means being recircularbly movable between a supply air contact area in which it contacts supply air to receive water content therefrom and thereby reduce the humidity of the supply air and a regeneration area in which water content is removed from the humidity reducing means, and means for cooling reduced humidity supply air, the cooling means being disposed downstream of the humidity reducing means.

In the system according to the another aspect of the present invention, there is also provided circulation means for circulating in a closed cycle a heat transfer medium among the cooling means, a first heat transfer zone disposed in the exhaust air passageway, and a second heat transfer zone disposed in the outside air passageway. The circulation means includes a conduit assembly for transporting the heat transfer medium in a closed loop out of direct contact with the supply air, the exhaust air, or the outside air, the passage of exhaust air into contact with the circulation means in the first transfer zone resulting in a heat exchange by which the exhaust air is heated and the heat transfer medium is cooled and the passage of outside air into contact with the circulation means resulting in another heat exchange by which the outside air is heated to become increased heat content outside air and the heat transfer medium is cooled, and the regeneration area for regenerating the humidity reducing means is disposed downstream of the second transfer zone in the outside air passageway for receiving increased heat content outside air in a regeneration process by which the increased heat content outside air removes water content of the humidity reducing means.

These and other important features and advantages of the invention will be apparent as this description proceeds.

The invention accordingly comprises the features of construction, combination of element and arrangement of parts that will be exemplified in the description hereinafter set forth, and the scope of the invention will be indicated in the claims.

BRIEF DESCRIPTION OF THE DRAWINGS

The present invention will be understood and appreciated more fully from the following detailed description of the preferred embodiments with reference to the drawings in which.

DETAILED DESCRIPTION OF THE INVENTION

Figure 1:
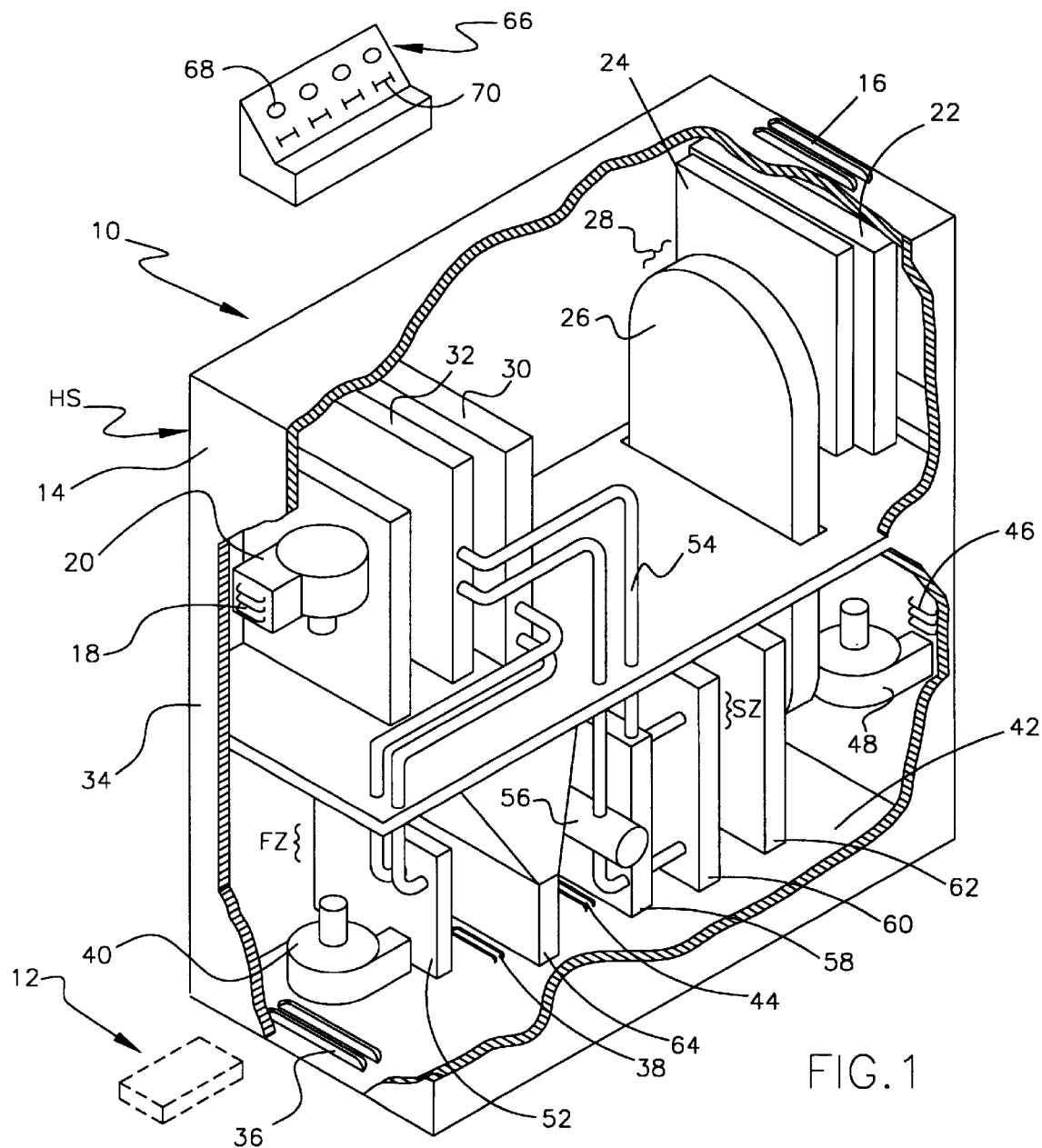
FIG. 1 is a perspective view in partial section of one embodiment of the air conditioning system of the present invention.
Figure 2:
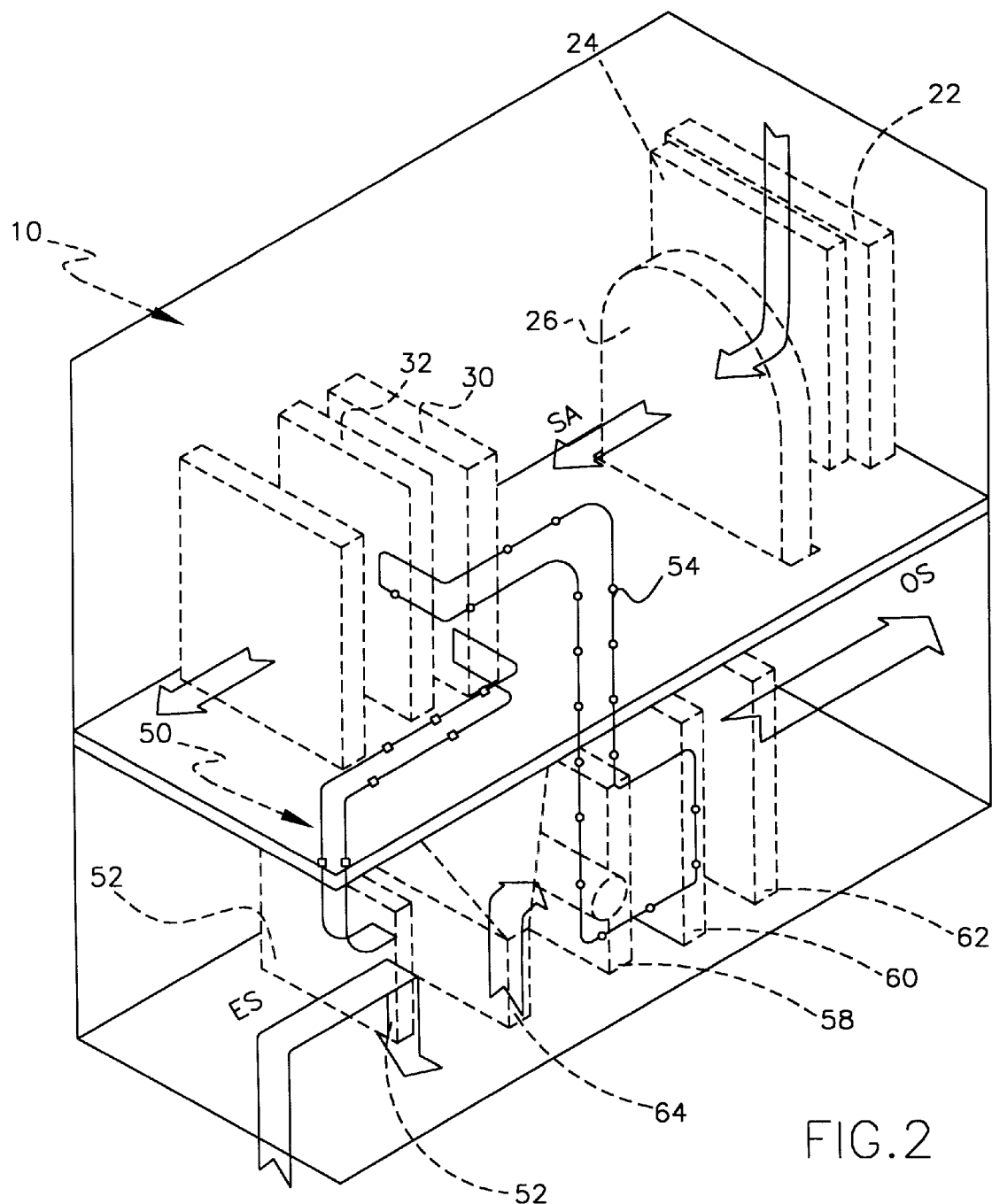
FIG. 2 is a schematic perspective view of the one embodiment of the air conditioning system shown in FIG. 1 and showing the paths of the supply air, exhaust air, and outside air streams through the air conditioning system.
Figure 3:
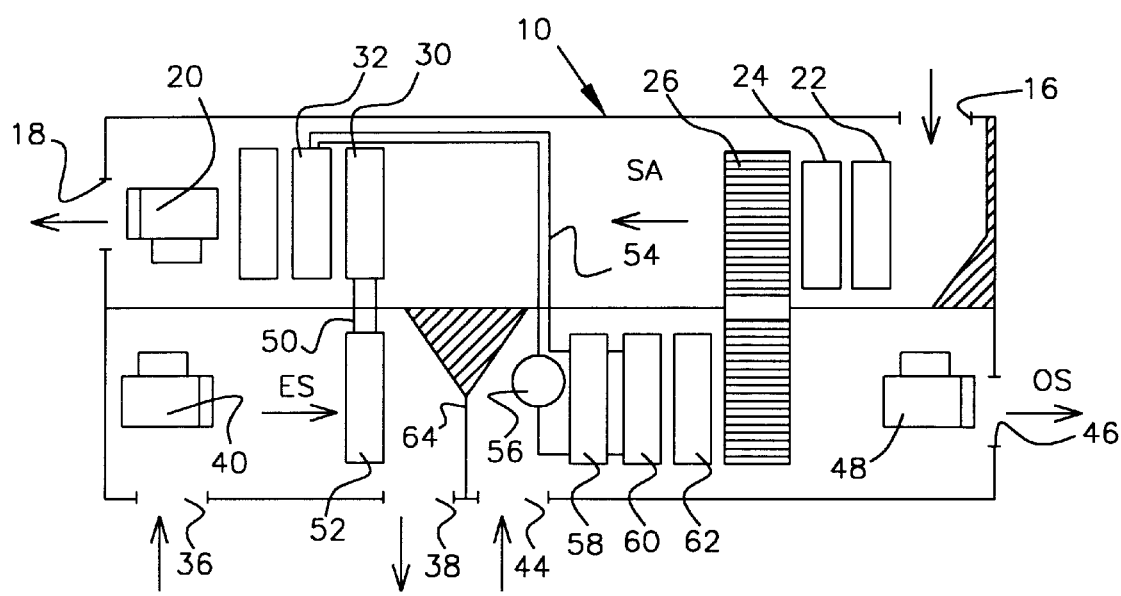
FIG. 3 is a side elevational view in vertical cutaway of the one embodiment of the air conditioning system shown in FIG. 1.

As illustrated in FIGS. 1, 2, and 3, one embodiment of the air conditioning system 10 of the present invention includes a combination of components for conditioning air to a selected reduced humidity and temperature whereupon the conditioned air is suitable to cool an interior space 12 (schematically shown in FIG. 1). The interior space 12 may be, for example, a room in a residence or an office. The components of the air conditioning system 10 are advantageously housed and supported in a single unit package, designated as a housing and support assembly HS, which can be readily mounted to a conventional plenum or surface mounting chassis.

As will now be described in further detail, the one embodiment of the air conditioning system 10 is operable to condition otherwise unconditioned air (i.e., air at an ambient temperature and unadjusted humidity) while permitting the user to select one of a multiple number of energy conservation arrangements for the operation of the air conditioning system. The air to be conditioned is hereinafter referred to as supply air SA, as seen in FIG. 2, and the air conditioning system 10 includes a means defining a passageway through which supply air flows during conditioning thereof. The supply air passageway is preferably formed by an upper enclosure portion 14 of the housing and support assembly HS and includes a supply air intake 16 through which air not being returned from the interior space 12 is drawn into the passageway and a conditioned air outlet 18 through which conditioned supply air SA is delivered directly into the interior space 12 or into an intermediate conduit or duct (not shown) communicating the air conditioning system 10 and the interior space 12.

A means for advancing supply air SA along the supply air passageway, preferably in the form of a blower 20, is mounted to the housing and support assembly HS and is operable to draw supply air SA into the supply air intake 16, advance the supply air SA through the upper enclosure assembly 14, and discharge conditioned supply air from the supply air passageway through the conditioned air outlet 18.

With further reference now to the components of the air conditioning system 10 which condition the supply air SA during its passage between the supply air intake 16 and the conditioned air outlet 18, it can be seen in FIG. 1 that the air conditioning system 10 includes means for pre-treating supply air SA to achieve two specific pretreatments of the supply air prior to several subsequent humidity and temperature adjustment steps: one pretreatment to suppress selected entrained constituents of the supply air SA and a second pretreatment to enhance selected characteristics of the supply air. These two pretreatments have the respective goals of beneficially removing harmful contaminants such as bacteria from the supply air and improving its odor. The pre-treating means is preferably in the form of an odor elimination device 22 having, for example, ozone for suppressing odor and, for example, an ultraviolet light box 24 disposed downstream of the odor elimination device 22 for eliminating ozone and killing air borne viruses and bacteria.

The conditioning portion of the air conditioning assembly 10 further includes a humidity reducing means disposed downstream of the ultraviolet light box 24 for reducing the humidity of the supply air SA after the undesired bacteria characteristics of the supply air SA have been suppressed by the odor elimination device 22 and the ultraviolet light box 24. The humidity reducing means is preferably in the form of a desiccant wheel 26 which is recircularbly movable between a supply air contact area 28 in which desiccant material on the wheel contacts the supply air SA to remove water vapor therefrom and a regeneration area in which moisture entrained on the wheel is removed.

The air conditioning system 10 further includes means for cooling the supply air SA after it has been conditioned to a reduced humidity state by the desiccant wheel 26. The cooling means is preferably in the form of one or more of any conventionally known mechanical-type cooling devices. For example, as seen in FIG. 1, the cooling means preferably includes a heat exchange assembly and a refrigerant-type cooling sub-system of which a heat exchanger 30 (of the heat exchange assembly) and an indirect evaporator 32 (of the refrigerant-type cooling sub-system) are mounted in the supply air passageway. The heat exchanger 30 and the evaporator 32 are each operable to remove sensible heat from the reduced humidity supply air SA.

With further reference to FIG. 1, it can be seen that the air conditioning system 10 additionally includes means defining an exhaust air passageway through which a return or exhaust air stream ES flows, as seen in FIG. 2, and which is preferably in the form of a first lower enclosure portion 34 of the housing and support assembly HS. The exhaust air stream ES is constituted of at least the exhaust air received from the interior space 12 and may additionally include unconditioned outside air mixed with the exhaust air (by means not shown). The first lower enclosure portion 34 includes an exhaust air intake 36 communicated with the interior space 12 for the intake of previously conditioned air which has circulated in the interior space as well as an exhaust air outlet 38. A blower 40 is mounted to the housing and support assembly HS and is operable to draw exhaust air through the exhaust air intake 36 into the exhaust air passageway and advance the exhaust air stream ES through the passageway and ultimately through the exhaust air outlet 38 to the exterior of the housing and support assembly HS.

A further component of the one embodiment of the air conditioning system 10 is a means defining an outside air passageway separate from the supply air passageway and the exhaust air passage through which flows an outside air stream OS, as seen in FIG. 2, comprised of air received from outside of the interior space 12. The outside air passageway is preferably formed by a second lower enclosure portion 42 of the housing and support assembly HS and includes an outside air intake 44 and an outside air outlet 46. A blower 48 is mounted to the housing and support assembly HS and is operable to draw outside air through the outside air intake 44 into the outside air passageway and to advance the outside air through the passageway and ultimately through the outside air outlet 46 to the exterior of the housing and support assembly HS.

The air conditioning system 10 conserves energy not only by utilizing both exhaust air and outside air to transfer heat from the cooling means but also by utilizing the outside air to cool the humidity reducing means. Moreover, this energy conservation operation is accomplished in a manner which prevents contamination of the humidity reducing means and, thus, reduces the risk of contamination of the conditioned supply air. This improved energy conservation operation is achieved by a heat transfer arrangement between the supply air passageway, on the one hand, and the exhaust air passageway and the outside air passageway, on the other hand, which maximizes the energy capture of the exhaust and outside air while foreclosing the risk that the exhaust air may contact the humidity reducing means (which could result in the type of contamination that promotes, for example, the outbreak of legionellosis).

The novel heat transfer arrangement of the air conditioning system 10 may comprise a single circulation means which circulates a heat transfer medium among the supply air, exhaust air, and outside air passageway in a non-contaminating manner. However, the heat transfer arrangement preferably comprises two separate circulation means: a first circulation means for circulating a heat transfer medium between the cooling means and the exhaust air passageway and a second circulation means for circulating a heat transfer medium between the cooling means and the outside air passageway. As will be described hereafter in more detail, the circulation means permits energy to be captured from the exhaust air without contamination risk while also permitting energy to be captured from the outside air to regenerate or replenish the humidity reducing (latent) means and as well as to cool the (mechanical) cooling means.

The first circulation means is preferably in the form of a first closed circulation sub-system such as the heat transfer assembly having the heat exchanger 30 and which circulates a heat transfer medium such as, for example, air, between the supply air passageway and a first heat transfer zone FZ in the exhaust air passageway whereat the exhaust air cools the heat transfer medium. In addition to the heat exchanger 30, the heat exchange assembly which comprises the first closed circulation sub-system includes an assembly of tubes 50 connected to and between the heat exchanger 30 and a heat exchanger 52 mounted transverse to the exhaust air stream ES in the exhaust air passageway.

As best seen in FIG. 2, the circulation path of the heat transfer medium through the tubes 50 (schematically designated by the square-blocked lines) is a closed loop in which the medium is not directly in contact with either the supply air SA or the exhaust air stream ES. This absence of direct contact is important for the reason that all relatively significant contamination risks of the supply air by the exhaust air are effectively foreclosed. In other words, substantially complete contamination prevention is assured because the physical separation of the upper enclosure portion 14 (which forms the supply air passageway) from the first lower enclosure portion 34 (which forms the exhaust air passageway) precludes direct contamination of the supply air by the exhaust air and the closed loop circulation of the heat transfer medium in the pipes 52 prevents indirect contamination of the supply air via the heat transfer medium.

With regard now to the second circulation means, this circulation means is preferably in the form of the refrigerant-type cooling system which comprises the evaporator 32 and further includes an assembly of tubes 54 connected to and between the evaporator 32 (disposed in the supply air passageway) and the other conventional components of a refrigerant system—namely, a compressor 56 and condenser coils 58. Additionally, to promote efficient operation of the coils of the evaporator 32, the second circulation means includes as well a heat exchanger 60 to which the tubes 54 are connected for circulating the heat transfer medium therethrough. The compressor 56, condenser coils 58 and the heat exchanger 60 are mounted to the housing and support assembly HS in a second heat transfer zone SZ in the outside air passageway for heat transfer between the heat transfer medium and the outside air stream OS.

The tubes 54 circulate a heat transfer medium such as, for example, a refrigerant, among the evaporator 32, the compressor 56, condenser coils 58, and the heat exchanger 60 (the path of the pipes 54 is schematically shown by the dash-circle lines in FIG. 2). The outside air stream OS, although hotter and possibly more humid than the conditioned air delivered to the interior space 12, is nonetheless cooler than the relatively higher temperature refrigerant circulating through the condenser coils 58 and the heat exchange promotes the condensation of the higher temperature condensed refrigerant. Additionally, the heat exchanger 60 further promotes condensation of the refrigerant flowing from the compressor 56 to the evaporator 32.

In addition to promoting energy conservation via heat transfer with the refrigerant cooling means, the outside air stream OS flowing through the second heat transfer zone SZ contributes to energy conservation of the air conditioning system 10 by regenerating the desiccant wheel 26. The desiccant regeneration is promoted by flowing the outside air stream OS over the condenser coils 58 (thus increasing the temperature of the outside air) and by flowing the outside air stream OS through an additional heating means such as, for example, a desuperheater 62 to further increase the outside air temperature while reducing the humidity of the air. The thus heated and at least partially dehumidified outside air then flows through the regeneration area to evaporate moisture on the moisture laden portions of the desiccant wheel 26 moving into the regeneration area.

The operation of the air conditioning system 10 in a cooling mode involves the flow of supply air through the supply air passageway simultaneously with the flow of at least one of the exhaust air and the outside air streams through their respective passageways. In an operational mode in which all three air streams are utilized, the system continuously intakes unconditioned outside air through the supply air intake while at the same time intaking outside air through the outside air intake and intaking exhaust air through the exhaust air intake. Looking further at this operational choice of intaking both outside air and exhaust air, one can understand the operation of conditioning of the supply air and the energy conservation effects of the outside air stream OS and the exhaust air stream ES with reference to the following description.

As best seen in FIG. 2, the supply air stream SA is impelled by the blower 20 through the supply air intake 16 and thereafter into contact with the odor elimination device 22 whereat ozone circulated by the device suppress certain odor mechanisms in the supply air. The supply air stream SA now serially flows through the ultraviolet light box 24 whereat ultraviolet light eliminates ozone and suppresses, optimally, all air borne contaminants such as bacteria in the supply air. While the odor and bacteria elimination steps may affect the temperature and humidity conditions of the supply air, the magnitude of these effects relative to subsequent conditioning steps is minimal and, in any event, the subsequent conditioning steps can be adjusted as desired to compensate for these effects.

After exiting the ultraviolet light box 24, the supply air stream SA next flows into contact with the desiccant wheel 26 whereat a conventional desiccant moisture release operation occurs with moisture being taken from the supply air while the temperature of the supply air concomitantly increases due to the release of the latent heat of vaporization. The now humidity reduced, increased temperature supply air flows serially into contact with the heat exchanger 30 whereat a sensible heat transfer operation effects a decrease in the temperature of the supply air and, as desired and depending upon the type of heat exchange, an adjustment in the humidity of the supply air.

The supply air stream SA exits the heat exchanger 30 to flow into contact with the evaporator 32 which is preferably an indirect evaporative type cooler in which cooled refrigerant circulates through a coil structure and the supply air contacts the outside of the coils without any direct contact with the refrigerant. This operation decreases the temperature of the supply air.

It is preferred that the mechanical cooling assistance of the heat exchanger 30 and the heat exchanges of the regeneration operations (to be described shortly) be coordinated with the operation of the evaporator 32 such that the coils of the evaporator can operate at below saturated moisture levels. When the relative humidity level of the supply air passing over the evaporator coils is relatively high, a not insignificant portion of the energy will be energy acting to condense the moisture of the supply air whereas it is preferred that the maximum energy be used to reduce the sensible heat of the supply air via heat exchange with the cooled refrigerant in the evaporator 32. The air conditioning system 10 of the present invention, however, can be operated to sufficiently decrease the moisture content of the supply air to thereby alleviate the problem of wet evaporator coils, thus leading to a more energy efficient air conditioning process.

With reference in particular to FIG. 2, the operational flexibility of the air conditioning system 10 can be understood by following the energy recoupment operations which the system provides. Although exhaust air exiting the interior space 12 is more humid and at a higher temperature than the conditioned supply air being delivered to the interior space, the exhaust air still has a sufficiently low enthalpy to contribute to the energy recoupment potential of the system and this energy is effectively used by passing the exhaust air stream ES through the heat exchanger 52 mounted in the exhaust air passageway. The exhaust air at least partially regenerates the elevated temperature heat transfer medium by cooling the heat transfer medium before it is again circulated via the tubes 52 to the heat exchanger 30 in the supply air passageway. The exhaust air is heated up during the heat exchange process by the sensible heat given up by the circulating heat transfer medium and the raised temperature exhaust air is then driven out of the air conditioning system 10 through the exhaust air outlet 38.

Exhaust air is thus utilized by the air conditioning system 10 in a manner in which the risk of contamination of the supply air is virtually eliminated while nonetheless recouping at least some of the latent energy of the exhaust air. As will be now understood from the following description of the energy recoupment from the outside air, the air conditioning system 10 advantageously utilizes both exhaust and outside air to regenerate the latent and sensible heat components of the system while minimizing contamination risks. As seen in FIG. 2, the outside air stream OS comprising ambient air not from the interior space 12 is drawn in through the outside air intake 44 and deflected by a baffle plate 64 to flow over the compressor 56 whereat the outside air removes some of the heat generated by the compressor. Additionally, the outside air passes over the condenser coils 58 to undergo a heat exchange with the relatively higher temperature compressed refrigerant circulating in the condenser coils.

Thereafter, the outside air passes over the heat exchanger 60 and the air temperature is further elevated. Additionally, the heated outside air may now also have a humidity level which must be reduced so that the exhaust air can be utilized to regenerate the desiccant wheel 26. Thus, the outside air exiting the heat exchanger 60 subsequently flows over the desuperheater 62, whereat the outside air is further heated while moisture in the outside air is vaporized. The outside air is now at an elevated temperature yet is partially dehumidified and this outside air now passes over the portion of the desiccant wheel 26 traveling through the second heat transfer zone SZ in the outside air passageway. The outside air removes moisture from that portion of the desiccant wheel to thereby regenerate the wheel portion for subsequent heat exchange with the supply air.

As seen in FIG. 1, one embodiment of the air conditioning system 10 preferably also includes a remote control panel 66 operatively connected to the conditioning and energy recoupment sub-systems for monitoring and controlling the operations of these sub-systems. The remote control panel 66 is connected to sensors (not shown) to monitor operational conditions and additionally includes a plurality of visual condition indicators 68 showing the monitored statuses of the sub-systems including an indicator to indicate the status of the ultraviolet light operation of the ultraviolet light box 24, a bad air indicator to indicate an undesirable air status, an indicator to indicate a selected humidity status, and an indicator to indicate a selected temperature status. The remote control panel 66 also includes a plurality of adjustment controls 70 for adjustment the operational conditions of the air conditioning system 10. Thus, the air conditioning system 10 permits the monitoring, alerting, and correction of bad air situations, moisture situations, and temperature situations.

While it is known that a desiccant wheel such as the desiccant wheel 26 can be regenerated by contact with outside air, conventional regeneration approaches carry the risk that contaminants in the outside air can be transferred to the supply air with the attendant possibility of legionellosis or another health danger. However, the air conditioning system 10 ensures that the outside air remains uncontaminated by the exhaust air (which may carry the types of bacteria that lead to legionellosis) while permitting the energy potential of the outside air to be tapped. This advantage is accomplished by the physical separation of the outside air passageway from the exhaust air passageway and the closed system nature of the heat transfer arrangement between the evaporator in the supply air passageway and the compressor 56 and condenser coils 58 in the outside air passageway. As seen in FIG. 1, the baffle plate 64 forms a barrier separating the exhaust air passageway and the outside air passageway and each of the two passageways is formed in the housing and support assembly HS such that only the respective exhaust or outside air is admitted into and drawn through the respective passageway.

Figure 4:
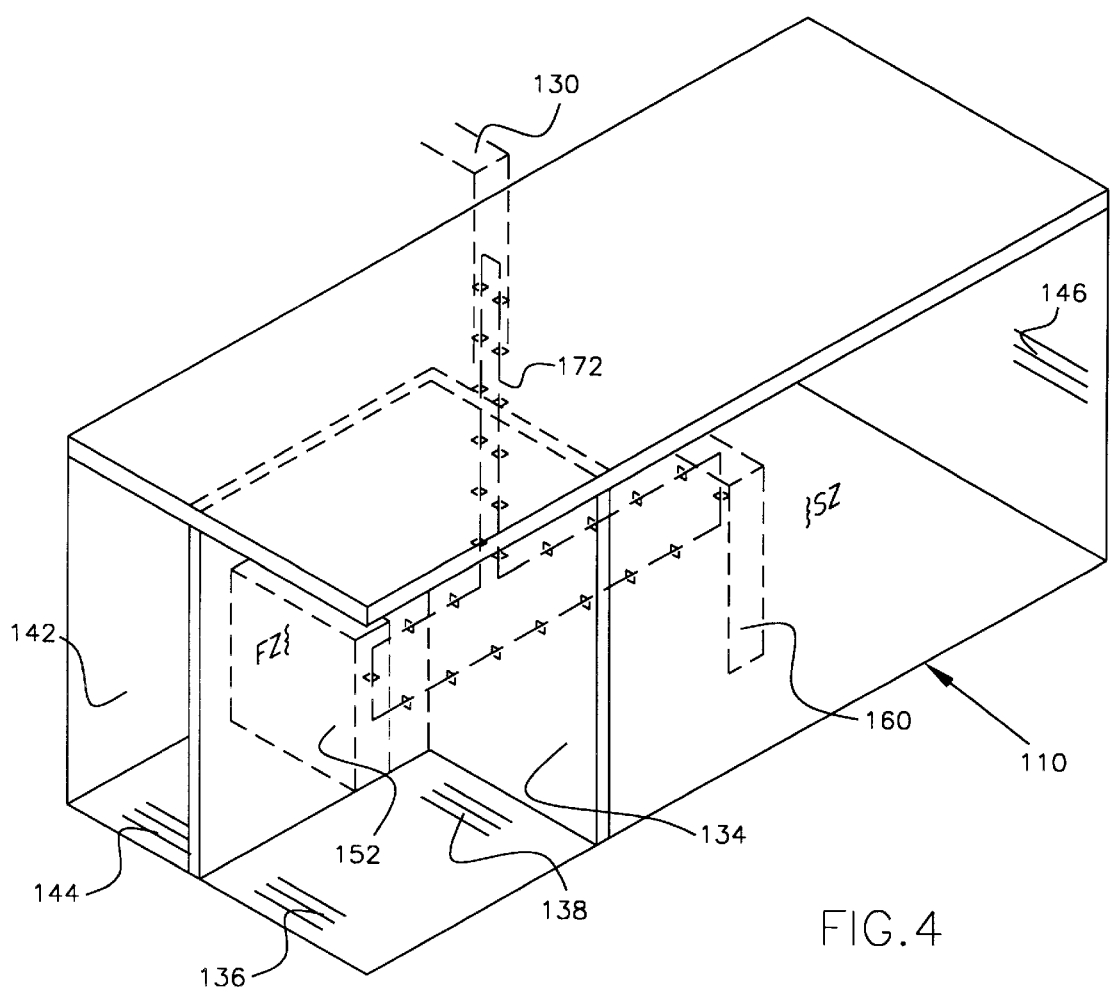
FIG. 4 is a schematic perspective view of a portion of another embodiment of the air conditioning system of the present invention.

With reference now to FIG. 4, another embodiment of the air conditioning system of the present invention is schematically illustrated and is designated as air conditioning system 110. The air conditioning system of this embodiment includes the same type of latent heat transfer arrangement (the desiccant wheel) and mechanical cooling arrangement (refrigerant-type) as the one embodiment of air conditioning system illustrated in FIGS. 1–3. However, this another embodiment includes a single closed loop circulation means for effecting heat transfer between the elements mounted in the supply air passageway, on the one hand, and the elements mounted in both the exhaust air and outside air passageways, on the other hand. Additionally, this another embodiment includes a side-by-side arrangement of the exhaust air and the outside air passageways which demonstrates the space accommodating flexibility of the single unit package design of the air conditioning system.

For purposes of brevity, only those sub-systems of the air conditioning system 110 which are different from those of the one embodiment shown in FIGS. 1–3 are hereinafter described, it being understood that the another embodiment shown in FIG. 4 includes all the other features of the one embodiment of the air conditioning system 10. Thus, the air conditioning system 110 includes means defining an exhaust air passageway which is preferably in the form of a first lower enclosure portion 134 of the housing and support assembly HS and which includes an exhaust air intake 136 and an exhaust air outlet 138. Also, the air conditioning system 110 includes a means defining an outside air passageway separate from the supply air passageway and the exhaust air passage through which flows an outside air stream which is preferably formed by a second lower enclosure portion 142 of the housing and support assembly HS and includes an outside air intake 144 and an outside air outlet 146. The portion of the outside air passageway comprising the outside air intake 144 is disposed in side-by-side relationship with the exhaust air passageway relative the longitudinal extent of the housing and support assembly HS and this arrangement permits access to both the exhaust air intake and the outside air intake from one end of the housing and support assembly HS while maintaining the physical separation of the exhaust air passageway and the outside air passageway from one another.

The air conditioning system 110 also includes a single circulation means as opposed to the two circulation means of the air conditioning system 10 of the one embodiment of the present invention. The single circulation means circulates in a closed cycle a heat transfer medium between the cooling means, on the one hand, and a first heat transfer zone disposed in the exhaust air passageway and a second heat transfer zone disposed in the outside air passageway, on the other hand. The circulation means includes a conduit assembly in the form of tubes 172 (schematically shown in FIG. 4 by dash-triangle lines) for transporting the heat transfer medium in a closed loop out of direct contact with the supply air, the exhaust air, or the outside air. The tubes 172 extend to and between the heat exchanger 130 of the mechanical cooling means (located in the supply air passageway), the heat exchanger 152 in the exhaust air passageway, and an element of the mechanical cooling assembly located in the outside air passageway such as, for example, the heat exchanger 160.

The passage of exhaust air into contact with tubes 172 in the first transfer zone FZ results in a heat exchange by which the exhaust air is heated and the heat transfer medium is cooled and the passage of outside air into contact with tubes 172 in the second heat transfer zone SZ results in another heat exchange by which the outside air is heated to become increased heat content outside air and the heat transfer medium is cooled. Also, the regeneration area for regenerating the humidity reducing means is disposed downstream of the second transfer zone SZ in the outside air passageway for receiving increased heat content outside air in a regeneration process by which the increased heat content outside air removes water content of the humidity reducing means.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A system for conditioning air to be supplied to an interior space, comprising:

means defining a passageway through which supply air flows during conditioning thereof, the supply air passageway being communicated with the interior space for delivery of conditioned supply air to the interior space;

means for advancing supply air along the supply air passageway;

means for reducing the humidity of supply air in the supply air passageway, the humidity reducing means being recircularbly movable between a supply air contact area in which it contacts supply air to receive water content therefrom and thereby reduce the humidity of the supply air and a regeneration area in which water content is removed from the humidity reducing means;

means for cooling reduced humidity supply air, the cooling means being disposed downstream of the humidity reducing means;

means defining an exhaust air passageway separate from the supply air passageway for the flow therethrough of an air stream constituted of at least exhaust air received from the interior space;

means defining an outside air passageway separate from the supply air passageway and the exhaust air passageway, the outside air passageway for the flow therethrough of outside air received from outside of the interior space;

first circulation means for circulating a heat transfer medium between the cooling means and a first transfer zone disposed in the exhaust air passageway; and second circulation means for circulating a heat transfer medium between the cooling means and a second transfer zone disposed in the outside air passageway, the passage of outside air into contact with the second circulation means resulting in a heat exchange between the heat transfer medium and outside air by which the outside air is heated to become increased heat content outside air and the heat transfer medium is cooled, the heat exchange in said second transfer zone further resulting in the vaporizing of moisture in said outside air, and the regeneration area for regenerating the humidity reducing means being disposed downstream of the second transfer zone in the outside air passageway for receiving increased heat content outside air in a regeneration process by which the increased heat content outside air removes water content of the humidity reducing means.

2. The system according to claim 1 wherein the humidity reducing means includes desiccant material operable to adsorb water content of supply air.

3. The system according to claim 1 and further comprising means for pre-treating the supply air prior to heat and humidity conditioning thereof to suppress selected entrained bacterial and viral constituents of the supply air and to enhance an odor characteristic of the supply air, the pre-treating means acting on the supply air during its flow through the supply air passageway.

4. The system according to claim 3 wherein pre-treating means includes ozone to suppress an odor characteristic of the supply air.

5. The system according to claim 3 wherein the pre-treating means includes an ultraviolet light box to suppress air borne virus and bacteria in the supply air.

6. The system according to claim 1 wherein the cooling means includes an evaporator disposed in the supply air passageway and a compressor and condenser coils disposed in the outside air passageway and the heat transfer medium of the second circulating medium is a refrigerant.

7. The system according to claim 1 and further comprising means for monitoring at least one of the humidity and temperature characteristics of an air, including means for monitoring an operational status of the ultraviolet light box and a bad air indicator for indicating an undesirable air status, and means for adjusting the operation of the system to adjust the characteristic.

8. A system for conditioning air to be supplied to an interior space, comprising:

means defining a passageway through which supply air flows during conditioning thereof, the supply air passageway being communicated with the interior space for delivery of conditioned supply air to the interior space;

means for advancing supply air along the supply air passageway;

means for reducing the humidity of supply air in the supply air passageway, the humidity reducing means being recircularbly movable between a supply air contact area in which it contacts supply air to receive water content therefrom and thereby reduce the humidity of the supply air and a regeneration area in which water content is removed from the humidity reducing means;

means for cooling reduced humidity supply air, the cooling means being disposed downstream of the humidity reducing means;

means defining an exhaust air passageway separate from the supply air passageway for the flow therethrough of an air stream constituted of at least exhaust air received from the interior space;

means defining an outside air passageway separate from the supply air passageway and the exhaust air passageway, the outside air passageway for the flow therethrough of outside air received from outside of the interior space; and circulation means for circulating in a closed cycle a heat transfer medium among the cooling means, a first transfer zone disposed in the exhaust air passageway, and a second transfer zone disposed in the outside air passageway, the circulation means including a conduit assembly for transporting the heat transfer medium in a closed loop out of direct contact with the supply air, the exhaust air, or the outside air, the passage of exhaust air into contact with the circulation means in the first transfer zone resulting in a heat exchange by which the exhaust air is heated and the heat transfer medium is cooled and the passage of outside air into contact with the circulation means resulting in another heat exchange by which the outside air is heated to become increased heat content outside air and the heat transfer medium is cooled, the heat exchange in said second transfer zone further resulting in the vaporizing of moisture in said outside air, and the regeneration area for regenerating the humidity reducing means being disposed downstream of the second transfer zone in the outside air passageway for receiving increased heat content outside air in a regeneration process by which the increased heat content outside air removes water content of the humidity reducing means.

9. The system according to claim 8 wherein the humidity reducing means includes desiccant material operable to adsorb water content of supply air.

10. The system according to claim 8 and further comprising means for pre-treating the supply air prior to heat and humidity conditioning thereof to suppress selected entrained bacterial and viral constituents of the supply air and to enhance an odor characteristic of the supply air, the pre-treating means acting on the supply air during its flow through the supply air passageway.

11. The system according to claim 10 wherein pre-treating means includes ozone to suppress an odor characteristic of the supply air.

12. The system according to claim 10 wherein the pre-treating means includes an ultraviolet light box to suppress air borne virus and bacteria in the supply air.

13. The system according to claim 8 wherein the cooling means includes an evaporator disposed in the supply air passageway and a compressor and condenser coils disposed in the outside air passageway and the heat transfer medium of the second circulating medium is a refrigerant.

14. The system according to claim 8 and further comprising means for monitoring at least one of the humidity and temperature characteristics of an air, including means for monitoring an operational status of the ultraviolet light box and a bad air indicator for indicating an undesirable air status, and means for adjusting the operation of the system to adjust the characteristic.

* * * * *